(12) United States Patent
Andrekson et al.

(10) Patent No.: US 7,199,870 B2
(45) Date of Patent: Apr. 3, 2007

(54) POLARIZATION INDEPENDENT OPTICAL SAMPLING ARRANGEMENT

(75) Inventors: Peter Andrekson, Fogelsville, PA (US); Bengt-Erik Olsson, Hovas (SE); Mathias Westlund, Gothenburg (SE)

(73) Assignee: PicoSolve Inc., Fogelsville, PA (US)

( * ) Notice: Subject to any disclaimer, the term of this patent is extended or adjusted under 35 U.S.C. 154(b) by 0 days.

(21) Appl. No.: 11/055,742

(22) Filed: Feb. 10, 2005

(65) Prior Publication Data

US 2006/0176472 A1 Aug. 10, 2006

(51) Int. Cl.
*G01N 21/00* (2006.01)

(52) U.S. Cl. .................................... 356/73.1

(58) Field of Classification Search ............. None
See application file for complete search history.

(56) References Cited

U.S. PATENT DOCUMENTS

| | | | |
|---|---|---|---|
| 6,229,633 B1 | 5/2001 | Roberts et al. | |
| 6,570,694 B1 | 5/2003 | Yegnanarayanan | |
| 6,654,105 B2 * | 11/2003 | Wang et al. ............... | 356/73.1 |
| 6,693,732 B2 | 2/2004 | Johnson et al. | |
| 6,744,508 B2 | 6/2004 | Jungerman et al. | |
| 6,751,385 B2 | 6/2004 | Futami et al. | |
| 6,804,047 B2 | 10/2004 | Byun et al. | |
| 6,937,782 B2 * | 8/2005 | Robinson et al. ............ | 385/16 |
| 6,943,881 B2 * | 9/2005 | Wang ........................ | 356/369 |
| 2003/0108265 A1 * | 6/2003 | Rao et al. ................... | 385/11 |
| 2003/0133652 A1 | 7/2003 | Andrekson et al. | |
| 2004/0133372 A1 | 7/2004 | Dorrer et al. | |

OTHER PUBLICATIONS

Mathias Westlund, Henrik Sunnerud, Bengt-Erik Olsson and Peter A. Andrekson, "Novel technique for polarization independent all-optical sampling in fiber," Optical Fiber Communication Conference (OFC), Los Angeles, USA, Paper ThN6, Feb. 2004.

Mathias Westlund, Henrik Sunnerud, Bengt-Erik Olsson and Peter A. Andrekson, "Simple scheme for polarization-independent all-optical sampling," IEEE photonics technology letters (PTL), vol. 16, pp. 2108-2110, Sep. 2004.

A. Tersigni, V. Calle, A. T. Clausen, L. K. Oxenløwe, J. Mørk, and P. Jeppesen, "Polarisation independent optical sampling using four-wave mixing," CLEO Baltimore, USA, Paper CMR2, 2003.

(Continued)

*Primary Examiner*—Tu T. Nguyen
(74) *Attorney, Agent, or Firm*—Wendy W. Koba

(57) ABSTRACT

A system and method for providing polarization-independent optical sampling utilizes a differential group delay (DGD) element to split a sampling pulse source (SPS) into orthogonal components by controlling the state of polarization of the SPS at the DGD element input. The orthogonally-polarized sampling pulse components then each interact with the input optical signal waveform in a polarization-dependent sampling gate, creating two samples for each original sampling pulse. The generated samples are converted into the electrical domain by a photodetector with an impulse response time longer than that associated with the DGD element, resulting in a single impulse response representing the combined energy of the two samples that is independent of the state of polarization of the input optical signal waveform.

14 Claims, 3 Drawing Sheets

OTHER PUBLICATIONS

N. Yamada, H. Ohta, and S. Nogiwa, "Polarisation independent optical sampling system using two-path configuration," Optical Fiber Communication Conference (OFC), Atlanta, USA, Paper MF92, 2003.

T. Sakamoto, K. Seo, K. Taira, N. S. Moon, and K. Kikuchi, "Polarization-insensitive all-optical time-division demultiplexer using a fiber four-wave mixer and a peak-hold optical phase-locked loop," ECOC Rimini, Italy, Th3.2.1, 2003.

J. Li, J. Hansryd, P. O. Hedekvist, P. A. Andrekson, and S. N. Knudsen, 300 Gbit/s eye-diagram measurement by optical sampling using fiber based parametric amplification, Optical Fiber Communication Conference (OFC), Anaheim, USA, PD31, 2001.

P. A. Andrekson, "Pico-second optical sampling using four-wave mixing in a fiber," Electron. Lett., vol. 27, pp. 1440-1441, 1991.

S. Watanabe, R. Okabe, F. Futami, R. Hainberger, C. Schmidt-Langhorst, C. Schubert, and H. G. Weber, "Novel fiber Kerr-switch with parametric gain: demonstration of optical demultiplexing and sampling up to 640 Gb/s", *ECOC 2004*, Th4.1.6, pp. 12-13, 2004.

H. Furukawa, H. Takakura, and K. Kuroda, "A novel optical device with wide bandwidth wavelength conversion and an optical sampling experiment at 200 Gbit/s", *IEEE Trans. on Instrumentation and Measurement*, 50, pp. 801-807, 2001.

H. Yoshidaya, H. Takakura, and K. Kuroda, "A novel optical wavelength conversion device for optical sampling", *IEEE Instrumentation and Measurement Technol. Conference*, pp. 687-692, 1998.

H. Ohta, N. Banjo, N. Yamada, S. Nogiwa, and Y. Yanagisawa, "Measuring eye diagram of 320 Gbit/s optical signal by optical sampling using passively modelocked fibre laser", *Electron. Lett.*, 37, pp. 1541-1542, 2001.

A. Otani, T. Otsubo, and H. Watanbe, "High sensitive optical sampling oscilloscope simultaneous coverage of both C and L bands", *OFC*, USA, WDD65, 2001.

N. Yamada, S. Nogiwa, and H. Ohta, "640-Gb/s OTDM signal measurement with high-resolution optical sampling using wavelength-tunable soliton pulses", *IEEE Photon. Technol. Lett.*, 16, pp. 1125-1127, 2004.

R. L. Jungerman, G. Lee, O. Buccafusca, Y. Kaneko, N. Itagaki, R. Shioda, A. Harada, Y. Nihei, and G. Sucha, "1-THz bandwidth C- and L-band optical sampling with a bit rate agile timebase", *IEEE Photon. Technol. Lett.*, 14, pp. 1148-1150, 2002.

T. Suhara, H. Ishizuki, M. Fujimura, and H. Nishihara, "Waveguide quasiphase-matched sum-frequency generation device for high-efficiency optical sampling", *IEEE Photon. Technol. Lett.*, 11, pp. 1027-1029, 1999.

S. Kawanishi, T. Yamamoto, M. Nakazawa, and M. M. Fejer, "High sensitivity waveform measurement with optical sampling using quasi-phasematched mixing in LiNbO3 waveguide", *Electron. Lett.*, 37, pp. 842-844, 2001.

C. Dorrer, D. C. Kilper, H. R. Stuart, G. Raybon, and M. G. Raymer, "Linear optical sampling," IEEE Photon. Technol. Lett., vol. 15, pp. 1746-1748, 2003.

I. Kang and K. F. Dreyer, "Sensitive 320 Gb/s eye diagram measurements via optical sampling with semiconductor optical amplifier-ultrafast nonlinear interferometer", *Electron. Lett.*, 39, pp. 1081-1082, 2003.

C. Schubert, S. Diez, J. Berger, R. Ludwig, U. Feiste, H. G. Weber, G. Toptchiyski, K. Petermann, and V. Krajinovic, "160-Gb/s all-optical demultiplexing using a gain-transparent ultrafast-nonlinear interferometer (GT-UNI)", *IEEE Photon. Technol. Lett.*, 13, pp. 475-477, 2001.

C. Schmidt, C. Schubert, S. Watanabe, F. Futami, R. Ludwig, and H. G. Weber, "320 Gb/s all-optical eye diagram sampling using gain-transparent ultrafast nonlinear interferometer (GT-UNI)", *ECOC 2002*, 2.1.3, 2002.

* cited by examiner

POLARIZATION INDEPENDENT OPTICAL SAMPLING ARRANGEMENT

TECHNICAL FIELD

The present invention relates to an optical sampling arrangement and, more particularly, to an optical sampling arrangement that is essentially independent of the state of polarization of the incoming signal.

BACKGROUND OF THE INVENTION

Optoelectronic technology and its applications are constantly expanding, with the result that integrated optics technology can be used with considerable advantage in communication systems. In general, optical signals embody information bits at very high bit rates (over 100 Gb/s in some cases), where such optical signals are often transmitted via single mode optical fiber. When an optical signal arrives at a receiver, the input optical signal is detected and converted into the transmitted information. In the input optical signal, each bit may be represented as an optical pulse having a particular waveform.

For measuring the waveforms of optical pulses used in high bit rate optical communications, it is common practice and desirable to use optical sampling, since it may exhibit higher sensitivity and improved temporal resolution over conventional electrical-based arrangements. Optical sampling systems often use a "probe" pulse signal (also referred to as a "sampling pulse source", or simply SPS) in combination with a very fast optical sampling gate to provide the desired high temporal resolution measurement. However, even though improving temporal resolution has been the driving force in the development of optical sampling systems, many other aspects come into play and are currently under investigation. Such aspects include, but are not limited to, signal sensitivity and dynamic range, timing and amplitude jitter of the SPS, optical signal bandwidth range, sample synchronizing schemes, signal clock recovery and signal polarization dependence.

In order to make an optical sampling gate independent of the polarization state of the input optical signal waveform, a variety of polarization diversity schemes have been proposed. By using a sampling gate with a two-path configuration such that the input optical signal is divided into two separate optical paths, it is possible to achieve a significant degree of polarization independence. In one arrangement, a sum-frequency generation technique using a pair of KTP crystals has been reported to achieve a marginal polarization dependence on the order of 0.15 dB, as disclosed in a conference proceeding entitled "Polarisation independent optical sampling system using two-path configuration", N. Yamada et al., OFC Proceedings 2004, Atlanta, Ga., paper MF92. In a reference entitled "Polarisation independent optical sampling using four-wave mixing" by A. Tersigni et al. presented at CLEO 2003, Baltimore, Md. as Paper CMR2, an arrangement including a polarization beam splitter and counterpropagating sampling pulses in a highly-nonlinear fiber (HNLF) has achieved a polarization dependence on the order of 0.7 dB. While these results are promising, the various known arrangements all require the use of a two-path configuration, adding both cost and complexity to the sampling system.

Thus, a need remains in the art for addressing the problem of polarization dependence in an optical sampling arrangement without requiring a multi-path solution, with its associated cost and complexity problems.

SUMMARY OF THE INVENTION

The need remaining in the prior art is addressed by the present invention, which relates to an optical sampling arrangement and, more particularly, to a polarization independent optical sampling arrangement that requires the use of only a single optical signal path, yet exhibits little (if any) polarization sensitivity.

In accordance with the present invention, a supplied source of sampling pulses and an input optical signal waveform are both subjected to an equal amount of differential group delay (DGD) in a polarization diversity arrangement, where the polarization axes of the diversity arrangement are oriented such that each sampling pulse is split into a pair of orthogonal components with similar peak pulse power. The split sampling pulses and the input optical signal are combined on a common signal path and applied as an input to a (polarization dependent) sampling gate. In the sampling gate, each polarization of the split signal will "sample" the corresponding polarization component of the input optical signal at the temporal overlap between the sampling pulses and optical signal waveform. The generated samples contain information about the power level of each polarization component of the optical signal waveform, separated in time by the DGD. The samples are then detected in an optoelectronic arrangement with an impulse response time longer that the delay associated with the DGD so as to yield a single impulse output representing the combined energy of the two polarization parts of the generated samples. The generated impulses can be collected and analyzed using, for example, a data acquisition card in a computer.

In one embodiment of the present invention, the desired amount of differential group delay and polarization splitting is provided by utilizing an optical coupler formed of polarization maintaining fiber. By controlling the orientation of the applied sampling pulses, the desired polarization splitting can be generated. The DGD for each signal (input and sample pulses) is determined by the polarization maintaining input arm used to form the coupler. As mentioned above, the amount of DGD imparted by each arm should be essentially equal, and should exceed the pulse width of the sampling pulses. A requirement on the sampling gate is that it is strongly dependent on the relative polarization state of the sampling pulses and the optical signal waveform in order to avoid cross-talk between the two generated orthogonal sampling channels.

In another embodiment, a conventional optical coupler may be used, in conjunction with a polarization controller disposed along the sampling pulses signal path and a section of polarization maintaining fiber (or other polarization means) disposed at the output of the optical coupler, with this combination again providing the desired splitting of each sampling pulse into an orthogonal pair, with a predetermined amount of spacing therebetween as controlled by the differential group delay imparted by the output polarization maintaining fiber.

Other and further embodiments and arrangements of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
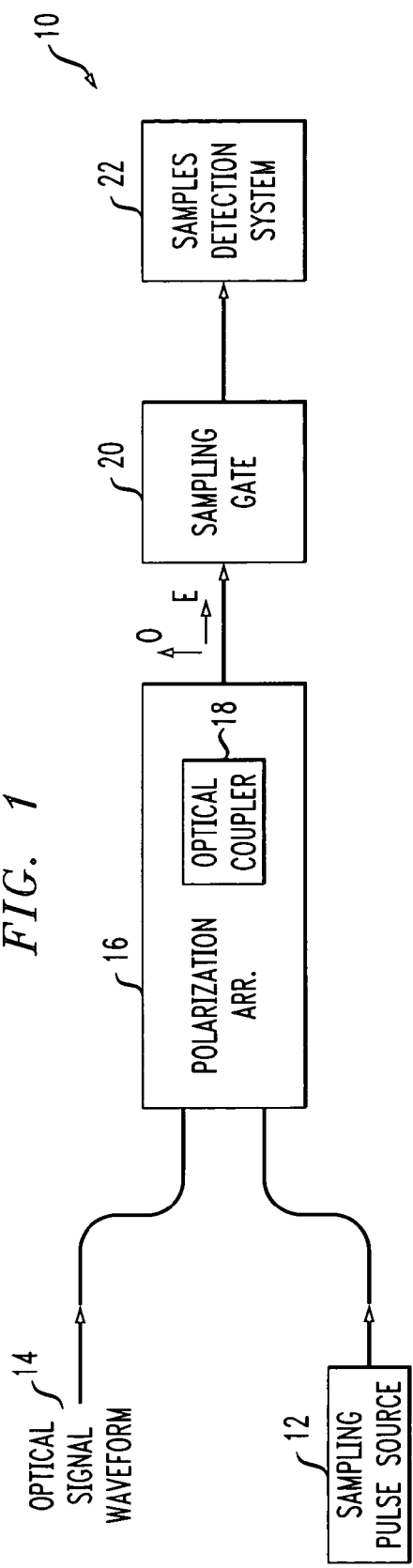
FIG. 1 contains a block diagram illustrating the general principles of the present invention.

FIG. 1 illustrates an exemplary arrangement 10 for implementing polarization-independent optical sampling in accordance with the present invention. As with the various prior art arrangements described above, arrangement 10 of the present invention utilizes a sampling pulse source (SPS) 12 to generate optical pulses suitable for use as sampling pulses. A received, input optical signal waveform 14 (to be detected using sampling) is also shown in FIG. 1. In its most general form, a polarization-based operation is performed on the sampling pulses, as represented by polarization arrangement 16 in FIG. 1. The polarized sampling pulses 12 and input signal 14 are both applied as inputs to polarization arrangement 16. As will be described hereinbelow in association with the specific embodiments of FIGS. 2 and 3, polarization arrangement 16 of the present invention functions to "split" each sampling pulse into a pair of orthogonal components, while introducing a predetermined time shift between the components, this time shift well-known in the art as the "differential group delay". That is, it is well-known that different polarizations of an optical signal will propagate with different group velocities along a signal path. The time delay difference between the polarizations is thus defined as the "differential group delay" (DGD).

As shown in FIG. 1, polarization arrangement 16 includes an optical coupler 18 that receives as separate inputs the sampling pulses and the input optical signal provides the combined output on a single output signal path. The combined sampling pulses and input signal are thereafter applied as an input to a sampling gate 20. Each sampling pulse component then "samples" the corresponding polarization of input signal 14 within sampling gate 20. The differential group delay associated with the polarization operation is such that the split sampling components are sufficiently separated in time such that the pulses are non-overlapping. Further, since both the input signal and the sampling pulses are affected by essentially the same amount of DGD, the sampling pulses will provide for an accurate recovery of the associated portion of the input signal. By using a sampling gate 20 that has a strong state of polarization (SOP)-dependence, two independent sampling components will be generated.

In accordance with the present invention, sampling gate 20 may comprise a variety of different arrangements, as long as the sampling gate is strongly dependent on the relative polarization state of the sampling pulses and the optical signal waveform, in order to avoid optical cross-talk between the two generated orthogonal sampling channels. For example, a four-wave mixing (FWM)-based sampling gate can be used. This FWM approach is generally a fiber-based arrangement, and is preferably formed of a highly nonlinear dispersion-shifted fiber (HNLF). Instead of fiber, it is possible to utilize a four-wave mixing element formed in bulk material and/or waveguide structures. Alternatively, a type of "linear" sampling, based on coherent mixing in a photodetector, may be used as sampling gate 20.

Other types of sampling gates may be used, based on phenomena such as sum-frequency generation, second-harmonic generation (SHG), difference-frequency generation (DFG) or cascaded SHG and DFG, in nonlinear materials of bulk or waveguide structures.

The output from sampling gate 20 is thereafter applied as an input to a detection system 22, where the response time of detection system 22 is selected to be much longer than the differential group delay associated with polarization arrangement 16. As a result, the two orthogonal components of each generated sample will be recovered during the same response period, resulting in a single impulse response that represents the combined energy of the two signal components. An exemplary embodiment of detector 22 may comprise a photodetector, amplifier, data acquisition card and a computer. The photodetector is selected to exhibit the relatively long impulse response so that the orthogonal components of each generated sample result in a single impulse response. The impulse response from the photodetector thus represents the combined energy of the two parts of the sample, or equally, the actual input signal 14 power level (independent of the input optical signal state of polarization). Ultimately, the photodetector impulse response may be measured by a data acquisition card and the measured signal can be presented by a computer for analysis.

Figure 2:
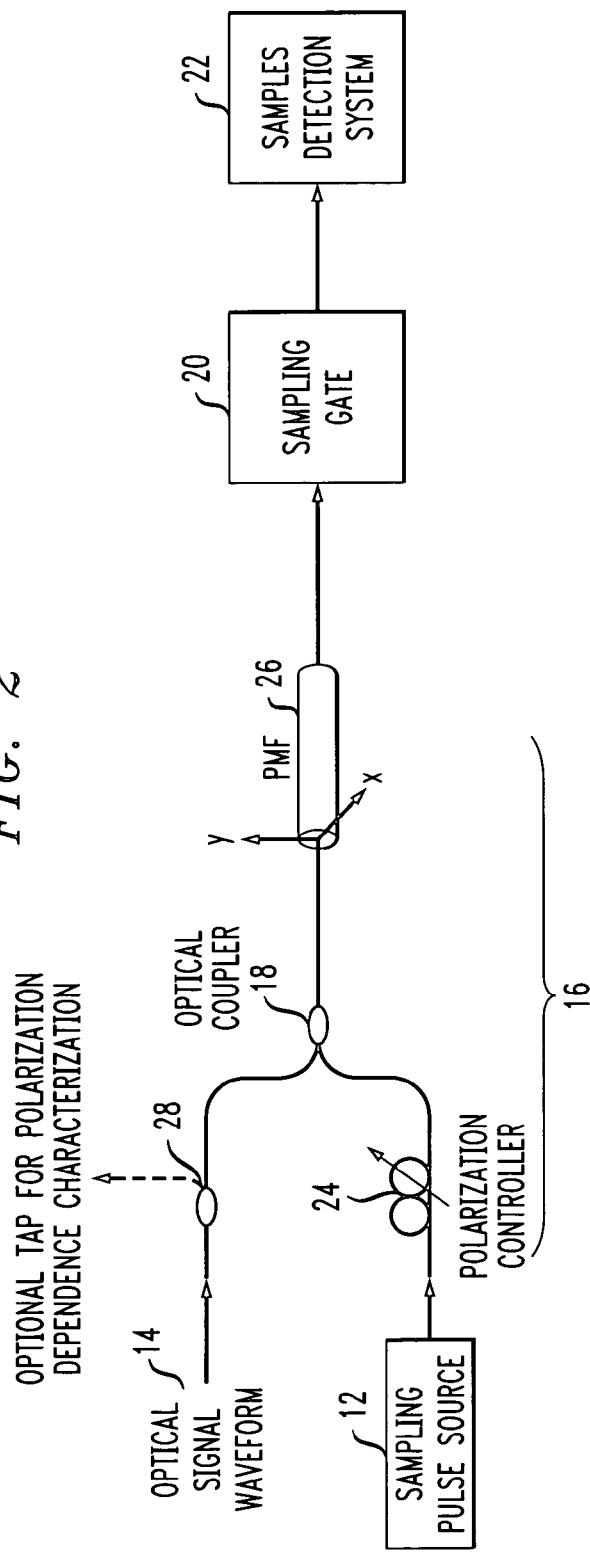
FIG. 2 illustrates an embodiment of the present invention utilizing a polarization controller and section of polarization-maintaining fiber.

FIG. 2 illustrates a specific embodiment of the present invention that utilizes a polarization controller 24 and a section of polarization maintaining fiber 26 as polarization arrangement 16. Polarization controller 24 is disposed at the output of sampling pulse source 12 and used to control the state of polarization (SOP) of the generated sampling pulses. In particular, polarization controller 24 is used to adjust the power splitting ratio between the two orthogonal sampling pulse components that will ultimately exit polarization maintaining fiber 26 so that the polarization dependence of the system is minimized. Input optical signal 14 is combined with the polarization controlled sampling pulses in optical coupler 18, where the combined signals are then applied as the input to polarization maintaining fiber 26. As both signals propagate through polarization maintaining fiber 26, they will advantageously experience exactly the same amount of differential group delay, allowing for the split sampling pulse components to properly sample the corresponding portion of the input signal, with the two components having little, if any, temporal overlap. An optical tap 28 may be included in this embodiment of the present invention and used to characterize the signal polarization dependence of this embodiment by measuring the SOP of the input optical signal. For example, a polarimeter may be used to measure the SOP of the input signal.

Figure 3:
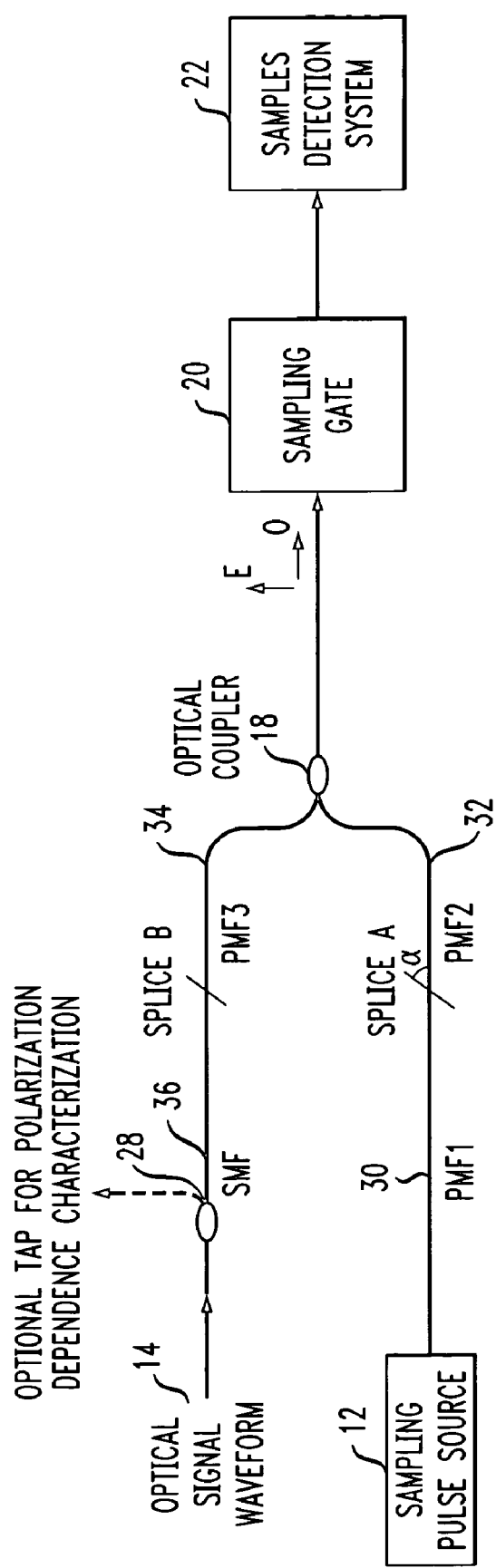
FIG. 3 illustrates an alternative embodiment of the present invention using a polarization-maintaining optical coupling element.

FIG. 3 illustrates an alternative embodiment of the present invention that utilizes a polarization-maintaining optical coupler as polarization arrangement 16 to provide the desired splitting and separating of the sample pulses. Referring to FIG. 3, the output from SPS 12 comprises a first section of polarization maintaining fiber 30. In accordance with the present invention, first section of polarization maintaining fiber 30 is coupled to a second section of polarization maintaining fiber 32, where fiber 32 is oriented with respect to fiber 30 so as to maintain a predetermined angle a between their respective polarization axes. In particular, angle α is selected to minimize the residual SOP dependence of input signal 14 at the output of the sampling system. Input signal 14 is itself passed through a third section of polarization maintaining fiber 34 that is used as the second input arm to optical coupler 18. In the particular arrangement as shown in FIG. 3, input signal 14 first propagates through a section of single mode fiber 36, which is spliced to polarization maintaining fiber 34. As before, an optical tap 28 may be coupled to single mode fiber 36 and used to monitor the SOP of input signal 14.

In this embodiment, the amount of differential group delay introduced by polarization maintaining fiber 32 and polarization maintaining fiber 34 must be essentially the same in order to avoid waveform distortions in the sampled optical output signal from sampling gate 20. As discussed above, the DGD of fibers 32 and 34 also needs to exceed the pulse width of the sampling pulses in order to achieve complete temporal splitting of the sampling pulses into two orthogonally polarized sampling pulse parts (as separated in time by the DGD). The power splitting ratio between the two orthogonally polarized sampling pulse parts is controlled by angle α between fibers 30 and 32, and is selected such that the residual signal polarization dependence of sampling arrangement 10 is minimized. In most cases, α should be approximately 45°.

At the exit of coupler 18, each sampling pulse has been split into two orthogonally-polarized sampling pulse components (illustrated "E" and "O" in FIG. 3) and are then combined in sampling gate 20 with optical signal 14, where as mentioned above optical signal 14 has experienced essentially the same amount of DGD. Similar to the embodiment described above, the output from sampling gate 20 will comprise sampled portions of input signal 14 as corresponding to the polarized components of the sampling pulses. Detector 22 (exhibiting an impulse response longer that the DGD) will receive the sampled outputs, combining the energy in the pair to form a detector output signal.

Figure 4:
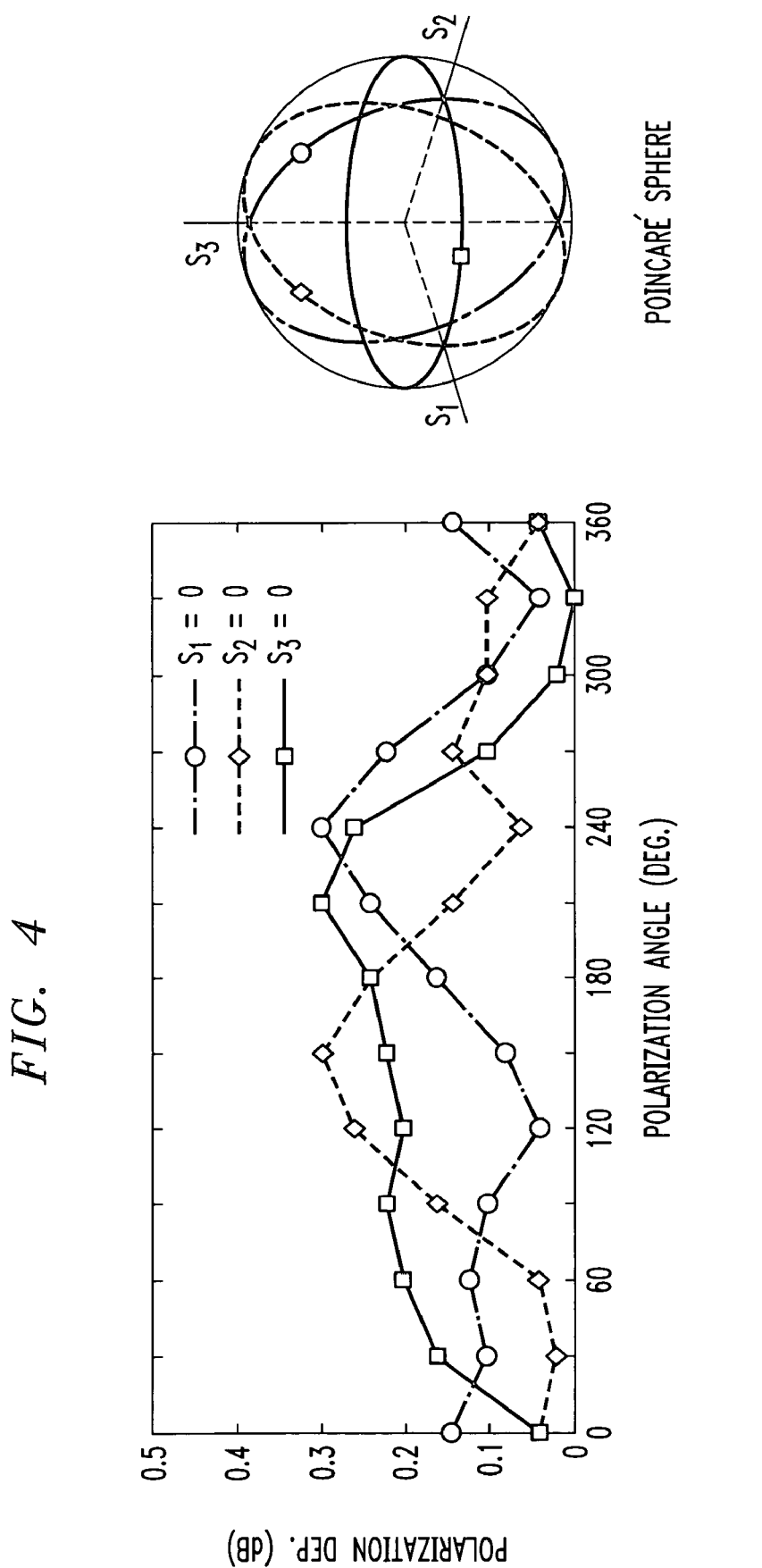
FIG. 4 contains a graph of the residual polarization dependence of the sampling arrangement of FIG. 2 as a function of the input signal state of polarization.

FIG. 4 shows a measurement of the residual polarization dependence of an exemplary embodiment of the present invention utilizing a section of dispersion-shifted highly nonlinear fiber (HNLF) to form a four-wave mixing arrangement as sampling gate 20. The polarization dependence of the sampling arrangement was measured as a function of the SOP of the optical signal waveform. The input SOP was measured using a polarimeter (for example, at the output of optical tap 28). Three series of twelve polarization states were each measured, these series being shown on the associated Poincaré sphere in FIG. 4. As known in the art, a Poincaré sphere represents all possible polarization states using the three Stokes parameters ($S_1$, $S_2$, $S_3$). Linearly polarized light ($S_3=0$) is represented by the equator on the Poincaré sphere, while the poles ($S_3=\pm1$) represent the circular polarization states. All remaining (intermediate) states correspond to elliptical polarizations. The three series of selected 12 polarization states for investigation in accordance with the present invention are represented by three different symbols on the Poincaré sphere, as well as by the three separate plots in FIG. 4. A first series (where $S_1=0$) is illustrated by the symbol ○ and the dashed-dotted line, a second series (where $S_2=0$) is illustrated by the symbol ◇ and the dashed line, and a third series (where $S_3=0$) is illustrated by the symbol □ and a solid line. The polarization dependence is defined as the ratio between the sampled amplitude at the current signal SOP and the minimum sampled amplitude of all measured SOPs (where the input signal power was held constant for all SOPs). The maximum polarization dependent was measured to be 0.3 dB (approximately 7%).

While the present invention has been described above in terms of preferred embodiments and experimental arrangements, it is to be understood that other variations in components may be employed to provide the desired polarization diversity within the sampling pulse signal as applied to an optical signal waveform in an optical sampling arrangement. Indeed, various components may be used to form the necessary coupler to combine the sample pulse train with the input optical signal waveform, as well as the sampling gate and detection system. All of these variations are considered to fall within the spirit and scope of the present invention as defined by the claims appended hereto.

What is claimed is:

1. A single path, polarization independent arrangement for sampling an input optical signal waveform, the arrangement comprising
    a source of optical sampling pulses, the pulses exhibiting a predetermined pulse width;
    an optical coupler for combining the pulses generating by the source of optical sampling pulses and the input optical signal waveform and providing the combined signals onto a single output path;
    a polarization arrangement associated with the optical coupler for splitting each pulse of the optical sampling pulses into a pair of orthogonal components, separated in time by a known amount of differential group delay, the arrangement further imparting a similar differential group delay to the input optical signal waveform;
    a sampling gate coupled to the output of the polarization arrangement for allowing the orthogonal components of the optical sampling pulses to probe the corresponding portions of the input optical signal waveform so as to form a sampled output optical signal; and
    a detector coupled to the output of the sampling gate for recovering the sampled output optical signal and providing an electronic equivalent, the detector exhibiting an impulse response longer than the differential group delay so that the orthogonal components are combined within a single response period.

2. The arrangement as defined in claim 1 wherein the polarization arrangement comprises a birefringent element for imparting the differential group delay to the sampling pulses and the input optical signal waveform.

3. The arrangement as defined in claim 2 wherein the birefringent element comprises at least one section of polarization maintaining fiber.

4. The arrangement as defined 3 wherein the optical coupler comprises polarization maintaining fiber incorporated with the polarization arrangement polarization maintaining fiber.

5. The arrangement as defined in claim 4 wherein the output of the source of optical sampling pulses comprises a section of polarization maintaining fiber, coupled to the optical coupler polarization maintaining fiber, with the polarization axes between the sections of polarization maintaining fiber maintained at a predetermined angle α associated with providing minimal polarization dependence.

6. The arrangement as defined in claim 5 wherein the predetermined angle α is approximately 45°.

7. The arrangement as defined in claim 1 wherein the polarization arrangement comprises a polarization controller disposed at the output of the source of optical sampling pulses, the polarization controller for aligning the sampling pulses with respect to the polarization arrangement so as to minimize polarization dependence at the output of the detector.

8. The arrangement as defined in claim 1 wherein the optical sampling gate is based on a nonlinear phenomenon selected from the group consisting of: four-wave mixing, sum-frequency generation, second-harmonic generation, difference-frequency generation, and cascaded elements for second-harmonic generation and difference-frequency generation.

9. The arrangement as defined in claim 8 wherein the optical sampling gate comprises a four-wave mixing element including a section of dispersion-shifted highly nonlinear fiber (HNLF).

10. The arrangement as defined in claim 8 wherein the optical sampling gate comprises a bulk material.

11. The arrangement as defined in claim 8 wherein the optical sampling gate comprises a waveguide structure.

12. The arrangement as defined in claim 1 wherein the optical sampling gate is based on a linear phenomenon utilizing coherent mixing between the optical sampling pulses and the input optical signal waveform.

13. A method for providing polarization independent, optical sampling of an incoming optical signal waveform, the method comprising the steps of:
   a) providing a stream of optical sampling pulses, having a predetermined pulse width and repetition rate;
   b) controlling the polarization state of the optical sampling pulse stream provided in step a) to exhibit a fixed, predetermined value;
   c) combining the fixed-polarization optical sampling pulse stream of step b) with the incoming optical signal waveform;
   d) coupling the combined signals to a differential group delay (DGD) element having polarization axes oriented with respect to the polarization axes of the control performed in step b) so as to split the optical sampling pulses into separate, orthogonal streams separated in time by the DGD;
   e) applying a polarization dependent optical sampling process to the combined signal in step d) to provide independent sampling of the incoming optical signal waveform in two orthogonal streams of optical sampling pulses; and
   f) detecting the two orthogonal streams in a photodetecting element with a response time longer than the delay associated with the DGD so as to generate an output signal with combined energy relating to the power level of the optical signal waveform at the overlap with the optical sampling pulses.

14. The method as defined in claim 13 wherein step d) is performed prior to step c), such that a differential group delay is imparted to each signal prior to combining the optical sampling pulse stream with the incoming optical signal waveform.

* * * * *